(12) United States Patent
Chu et al.

(10) Patent No.: US 11,360,705 B2
(45) Date of Patent: Jun. 14, 2022

(54) METHOD AND DEVICE FOR QUEUING AND EXECUTING OPERATION COMMANDS ON A HARD DISK

(71) Applicant: HUAWEI TECHNOLOGIES CO., LTD., Shenzhen (CN)

(72) Inventors: Xiaowei Chu, Hangzhou (CN); Xianming Zhao, Shanghai (CN); Hao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 16/746,241

(22) Filed: Jan. 17, 2020

(65) Prior Publication Data

US 2020/0150903 A1 May 14, 2020

Related U.S. Application Data

(63) Continuation of application No. PCT/CN2018/090583, filed on Jun. 11, 2018.

(30) Foreign Application Priority Data

Sep. 29, 2017 (CN) .......................... 201710915987.3

(51) Int. Cl.
G06F 3/06 (2006.01)

(52) U.S. Cl.
CPC ............ *G06F 3/0659* (2013.01); *G06F 3/061* (2013.01); *G06F 3/064* (2013.01); *G06F 3/0679* (2013.01)

(58) Field of Classification Search
CPC ........ G06F 3/061; G06F 3/0611; G06F 3/064; G06F 3/0659; G06F 3/0679; G06F 3/0688; G06F 12/02

See application file for complete search history.

(56) References Cited

U.S. PATENT DOCUMENTS

| | | | |
|---|---|---|---|
| 9,600,205 B1 * | 3/2017 | Nowell | ................. G06F 3/0625 |
| 2006/0047998 A1 * | 3/2006 | Darcy | ................... G06F 3/0619 |
| | | | 714/6.12 |
| 2013/0019057 A1 | 1/2013 | Stephens | |
| 2015/0074328 A1 * | 3/2015 | Baryudin | .............. G06F 3/0665 |
| | | | 711/103 |

(Continued)

FOREIGN PATENT DOCUMENTS

| | | |
|---|---|---|
| CN | 101819509 A | 9/2010 |
| CN | 103559138 A | 2/2014 |

(Continued)

*Primary Examiner* — Larry T Mackall
(74) *Attorney, Agent, or Firm* — Stein IP, LLC

(57) ABSTRACT

A method for executing a hard disk operation command, a hard disk, and a storage medium. After an operation command is received, a target LUN in an idle state is determined; a target physical block that is to be accessed when the operation command is executed is determined from the target LUN; the operation command is stored in a processing waiting queue corresponding to a flash memory chip to which the target physical block belongs; and a working state of the target LUN is changed to a non-idle state when a quantity of operation commands that wait to be processed in a processing waiting queue respectively corresponding to each flash memory chip in the target LUN is greater than a preset threshold.

18 Claims, 6 Drawing Sheets

(56) References Cited

U.S. PATENT DOCUMENTS

2016/0162215 A1* 6/2016 Jayaraman ............ G06F 3/0688
711/103

FOREIGN PATENT DOCUMENTS

| CN | 104809075 A | 7/2015 |
| CN | 105159836 A | 12/2015 |
| CN | 106126124 A | 11/2016 |

* cited by examiner

METHOD AND DEVICE FOR QUEUING AND EXECUTING OPERATION COMMANDS ON A HARD DISK

CROSS-REFERENCE TO RELATED APPLICATIONS

This application is a continuation of International Application No. PCT/CN2018/090583, filed on Jun. 11, 2018, which claims priority to Chinese Patent Application No. 201710915987.3, filed on Sep. 29, 2017. The disclosures of the aforementioned applications are hereby incorporated by reference in their entireties.

TECHNICAL FIELD

The present application relates to the field of communications technologies, and in particular, to a method for executing a hard disk operation command, a hard disk, and a storage medium.

BACKGROUND

A solid state disk (SSD) includes a controller and a flash memory array, and the flash memory array includes a plurality of flash memory chips. An interior of each flash memory chip includes thousands of physical blocks of a same size. A size of the physical block is usually between several hundred KB and several MB. An interior of each physical block is further divided into several pages of a same size, and a size of the page is usually 4 KB or 8 KB. Before writing data, the controller clears data in the physical block by using the physical block as a granularity. When writing data, the controller writes the data into the flash memory array by using the page as a granularity. In a storage field, two actions of data clearance and data writing are collectively referred to as program/erase (P/E) of data. A quantity of P/E times in each physical block is limited. After a quantity of P/E times in a specific physical block reaches an upper limit, it cannot be ensured that the physical block can continue to effectively access data.

To avoid a failure of the physical block that is caused because the quantity of P/E times reaches the upper limit, and also to accelerate a speed at which the solid state disk responds to a write request, the solid state disk performs management in an address space virtualization manner, all flash memory chips are logically divided into a plurality of groups, a physical block in any flash memory chip in a different group forms a logical block, and physical blocks in each logical block are different physical blocks in different flash memory chips. When new data is to be written, after determining a logical block that needs to be accessed to write the new data, the solid state disk does not select a physical block to which a page that stores old data in the logical block belongs to store the data, but instead the solid state disk selects a physical block to which a cleared page belongs to store the new data, and records, by using a mapping table, a mapping relationship between an address of the logical block and an address of the physical block to which the cleared page belongs. The page that stores the old data is referred to as a garbage page. The solid state disk reads the garbage page according to a collection policy, and collects the garbage page. To be specific, the solid state disk clears the data in the garbage page. For example, the solid state disk deletes the data in the garbage page or moves the data in the garbage page to another redundant flash memory chip or another redundant physical block, to write data into the cleared page next time.

After receiving an operation command, the solid state disk determines, by using the controller, a physical block that is to be accessed when the operation command is executed, and stores the operation command in a processing waiting queue corresponding to a flash memory chip to which the physical block belongs, and the controller sequentially processes, in a sequence in which operation commands are stored, the operation commands in the processing waiting queue corresponding to the flash memory chip. There are four types of operation commands. The four types of operation commands respectively are an input/output (I/O) read command, an I/O write command, a garbage collection (GC) write command, and a GC read command. The I/O read command is used to instruct to read data in a physical block that is to be accessed when the I/O read command is executed. The I/O write command is used to instruct to write data into a physical block that is to be accessed when the I/O write command is executed. The GC read command is used to instruct to read data in a physical block that is to be accessed when the GC read command is executed. The GC write command is used to instruct to write, into a physical block that is to be accessed when an I/O write command is executed, data read according to a GC read command. The physical block that is to be accessed when the I/O read command is executed is determined by a client, and the controller has no other selection for the physical block that is to be accessed when the I/O read command is executed. If a plurality of other operation commands have been stored in the processing waiting queue corresponding to the flash memory chip before the I/O read command is stored, the controller can execute the I/O read command only after completing processing of the other operation commands, thereby increasing a delay of an I/O read command of the client and further reducing communication efficiency of the client.

SUMMARY

This application provide a method for executing a hard disk operation command, a hard disk, and a storage medium, to reduce a delay of an I/O read command and improve communication efficiency of a client.

According to a first aspect, this application provides a method for executing a hard disk operation command, where the method is applied to a hard disk, the hard disk includes a controller and at least two flash memory chip groups, each flash memory chip group includes at least one flash memory chip, each flash memory chip includes a plurality of physical blocks, a flash memory chip in each flash memory chip group forms a logical unit (LUN), each flash memory chip belongs to one LUN, and the method is performed by the controller and includes:

after an operation command is received, determining a target LUN, where a working state of the target LUN is an idle state, and when the target LUN is in the idle state, a quantity of operation commands that wait to be processed in a processing waiting queue respectively corresponding to each flash memory chip in the target LUN is less than or equal to a preset threshold;

determining, from the target LUN, a target physical block that is to be accessed when the operation command is executed;

storing the operation command in a processing waiting queue corresponding to a flash memory chip to which the target physical block belongs; and when the quantity of operation commands that wait to be processed in the processing waiting queue respectively corresponding to each flash memory chip in the target LUN is greater than the preset threshold, changing the working state of the target LUN to a non-idle state.

According to an aspect, in some implementations, after receiving the operation command, the controller in the hard disk may first determine the target LUN whose working state is the idle state, and then determine, from the target LUN whose working state is the idle state, the target physical block that is to be accessed when the operation command is executed. Because the quantity of operation commands that wait to be processed in the processing waiting queue respectively corresponding to each flash memory chip in the target LUN is less than or equal to the preset threshold when the target LUN is in the idle state, a quantity of operation commands that wait to be processed in a processing waiting queue corresponding to a flash memory chip to which each physical block in the target LUN belongs is less than or equal to the preset threshold. In this case, in this application, the controller uses, as a target physical block, a physical block belonging to a chip corresponding to the processing waiting queue in which the quantity of stored operation commands is equal to or less than the preset threshold, and therefore, the processing waiting queue corresponding to the flash memory chip to which the target physical block that is to be accessed according to the I/O read command belongs may include a relatively small quantity of other operation commands, thereby reducing a delay of an I/O read command of a client and improving communication efficiency of the client.

With reference to the first aspect, in some implementations of the first aspect, any physical block in any flash memory chip in each flash memory chip group forms a logical block, physical blocks that are in a same flash memory chip and that are in different logical blocks are different, the operation command includes an I/O write command, a garbage collection write command, or a garbage collection read command, and before the determining a target LUN whose working state is an idle state, the method further includes:

determining a target logical block, where an operation state of the target logical block is an idle state, and when the target logical block is in the idle state, a processing waiting queue respectively corresponding to a flash memory chip to which each physical block in the target logical block belongs does not include another operation command that needs to be executed when any physical block in the target logical block is accessed, and the target LUN includes a flash memory chip to which each physical block in the target logical block belongs.

With reference to the first aspect or the foregoing possible implementation, in a second possible implementation of the first aspect, when the operation command is the I/O write command or the garbage collection write command, the target physical block in the target LUN is a new block.

With reference to the first aspect, in some implementations of the first aspect, the operation command includes the I/O write command, the garbage collection write command, or the garbage collection read command, and the determining a target LUN includes:

querying a LUN state table and determining a target LUN that has a working state parameter whose value indicates the idle state, where the DUN state table includes a working state parameter of each LUN in the hard disk, and the working state parameter of the LUN is used to indicate a working state of the LUN.

With reference to the first aspect, in some implementations of the first aspect, if the preset threshold is zero, the method further includes:

executing the operation command and changing the operation state of the target logical block to a non-idle state.

With reference to the first aspect, in some implementations of the first aspect, if the preset threshold is zero, the method further includes:

after the operation command is executed, changing the operation state of the target logical block to the idle state.

With reference to the first aspect, in some implementations of the first aspect, the method further includes:

when operation states of all logical blocks in the target LUN are the idle state, changing a value of the working state parameter of the target LUN to the value that indicates the idle state.

According to a second aspect, this application provides a hard disk, where an apparatus is disposed in the hard disk, the hard disk includes a controller and at least two flash memory chip groups, each flash memory chip group includes at least one flash memory chip, each flash memory chip includes a plurality of physical blocks, any flash memory chip in each flash memory chip group forms a LUN, flash memory chips that are in a same flash memory chip group and that are located in different LUNs are different, and the controller includes:

a determining unit, configured to: after an operation command is received, determine a target LUN, where a working state of the target LUN is an idle state, and when the target LUN is in the idle state, a quantity of operation commands that wait to be processed in a processing waiting queue respectively corresponding to each flash memory chip in the target LUN is less than or equal to a preset threshold, where the determining unit is further configured to determine, from the target LUN, a target physical block that is to be accessed when the operation command is executed;

a save unit, configured to store the operation command in a processing waiting queue corresponding to a flash memory chip to which the target physical block belongs; and a changing unit, configured to: when the quantity of operation commands that wait to be processed in the processing waiting queue respectively corresponding to each flash memory chip in the target LUN is greater than the preset threshold, change the working state of the target LUN to a non-idle state.

With reference to the second aspect, in some implementations of the second aspect, any physical block in any flash memory chip in each flash memory chip group forms a logical block, physical blocks that are in a same flash memory chip and that are in different logical blocks are different, the operation command includes an I/O write command, a garbage collection write command, or a garbage collection read command; and the determining unit is further configured to determine a target logical block, where an operation state of the target logical block is an idle state, and when the target logical block is in the idle state, a processing waiting queue respectively corresponding to a flash memory chip to which each physical block in the target logical block belongs does not include another operation command that needs to be executed when any physical block in the target logical block is accessed, and the target LUN includes a flash memory chip to which each physical block in the target logical block belongs.

With reference to the second aspect, in some implementations of the second aspect, when the operation command is the I/O write command or the garbage collection write command, the target physical block in the target LUN is a new block.

With reference to the second aspect, in some implementations of the second aspect, the operation command includes the I/O write command, the garbage collection write command, or the garbage collection read command, and the determining unit is specifically configured to query a LUN state table and determine a target LUN that has a working state parameter whose value indicates the idle state, where the LUN state table includes a working state parameter of each LUN in the hard disk, and the working state parameter of the LUN is used to indicate a working state of the LUN.

With reference to the second aspect, in some implementations of the second aspect, if the preset threshold is zero, the controller further includes:

an execution unit, configured to execute the operation command, where the changing unit is further configured to change the operation state of the target logical block to a non-idle state.

With reference to the second aspect, in some implementations of the second aspect, if the preset threshold is zero, the changing unit is further configured to: after the operation command is executed, change the operation state of the target logical block to the idle state.

With reference to the second aspect, in some implementations of the second aspect, the changing unit is further configured to: when operation states of all logical blocks in the target LUN are the idle state, change a value of the working state parameter of the target LUN to the value that indicates the idle state.

According to a third aspect, this application provides a hard disk, and the hard disk includes one or more processors, a memory, and a communications interface;

the memory and the communications interface are coupled to the one or more processors; and the memory is configured to store computer program code, where the computer program code includes an instruction, and when the one or more processors execute the instruction, the hard disk performs the method according to the first aspect.

According to a fourth aspect, this application provides a computer readable storage medium, the computer readable storage medium stores an instruction, and when the instruction runs on a hard disk, the hard disk performs the method according to the first aspect.

According to a fifth aspect, this application provides a computer program product including an instruction, and when the computer program product runs on a hard disk, the hard disk performs the method according to the first aspect.

BRIEF DESCRIPTION OF DRAWINGS

To describe the technical solutions in the embodiments of the present application more clearly, the following briefly describes the accompanying drawings required for describing the embodiments of the present application apparently.

DESCRIPTION OF EMBODIMENTS

The following clearly describes the technical solutions in the embodiments of the present application with reference to the accompanying drawings in the embodiments of the present application.

Figure 1:
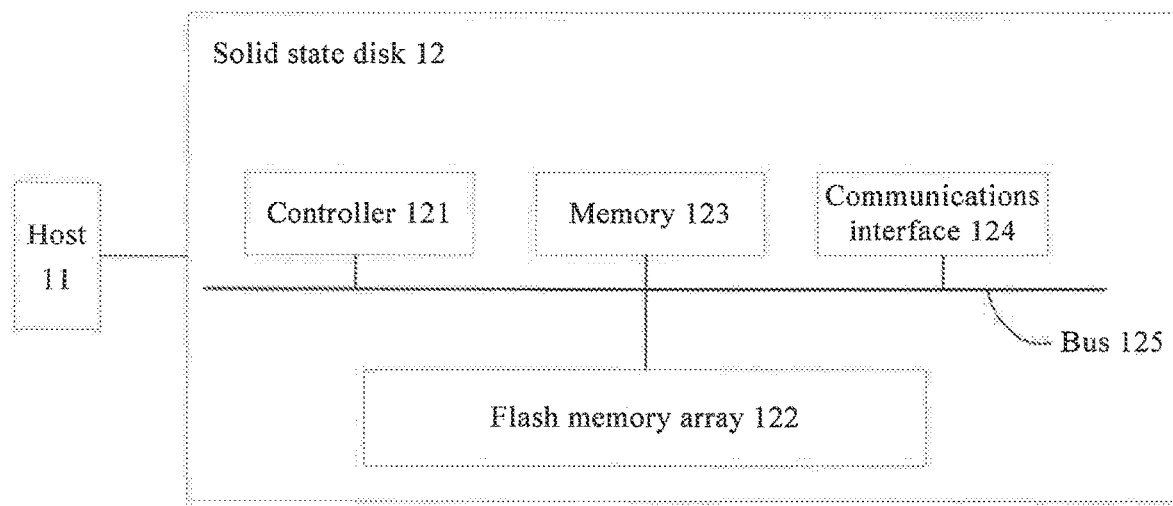
FIG. 1 is a schematic diagram of a network architecture according to an embodiment of the present application.

The embodiments of the present application are applicable to a scenario in which an operation instruction is executed in a hard disk. In the embodiments of the present application, an example in which an operation instruction is executed in a solid state disk is used for description. FIG. 1 is a schematic diagram of a network architecture applicable to an embodiment of the present application. FIG. 1 shows that the network architecture includes: a host (client) 11 and a solid state disk 12, and a connection between the host 11 and the solid state disk 12.

The solid state disk 12 is configured to execute an operation command delivered by the host 11.

For example, when the host 11 needs to write data into the solid state disk 12 or read data stored in the solid state disk 12, the host 11 delivers an operation command to the solid state disk 12. Operation commands include an I/O read command and an I/O write command. When the operation command is the I/O read command, the I/O read command instructs to read data in the solid state disk 12; or when the operation command is the I/O write command, the I/O write command instructs to write data into the solid state disk 12.

As shown in FIG. 1, the solid state disk 12 includes a controller 121, a flash memory array 122, and a communications interface 124. The communications interface 124 is configured to communicate with a device such as the host 11. For example, the communications interface 124 is configured to receive an operation command delivered by the host 11. The flash memory array 122 includes a plurality of flash memory chips. An interior of each flash memory chip includes thousands of physical blocks of a same size. A size of the physical block is usually between several hundred KB and several MB. An interior of each physical block is further divided into several pages of a same size, and a size of the page is usually 4 KB or 8 KB. The controller 121 may execute an I/O write command delivered by the host 11. When writing data, the controller 121 writes the data into the flash memory array 122 by using the page as a granularity. After data is written, when the host 11 needs to read data, the controller 121 executes an I/O read command delivered by the host 11, to read the data previously written into the flash memory array 122.

If there is garbage data in a physical block, the controller 121 clears the garbage data in the physical block, so that when data subsequently needs to be written, the controller 121 writes, into the cleared physical block by using a page as a granularity, the data that needs to be written. When clearing the data in the physical block, the controller 121 reads garbage data in a to-be-cleared garbage page in the physical block by executing a GC read command, and then writes, into another physical block by executing a GC write command, the garbage data read by executing the GC read command, to move the garbage data in the garbage page to another physical block, thereby obtaining a cleared page by clearing the garbage page. Therefore, operation commands that may be executed by the controller 121 include the I/O read command, the I/O write command, the GC write command, and the GC read command. After receiving the operation command, the controller 121 determines a physical block that is to be accessed when the operation command is executed, and then stores the operation command in a processing waiting queue corresponding to a flash memory chip to which the physical block that is to be accessed when the operation command is executed belongs, and the controller 121 may sequentially process, in a sequence in which operation commands are stored, the operation commands in the processing waiting queue corresponding to the flash memory chip. The controller 121 may be implemented by using a control chip. For example, the controller 121 may be an application-specific integrated circuit (ASIC), a programmable logic device (PLD), or a processor, as examples.

As shown in FIG. 1, the solid state disk 12 may further include a memory 123. The controller 121 is connected to the memory 123. The memory 123 may independently exist, and is connected to the controller 121 by using a bus 125. Alternatively, the memory 123 may be integrated with the controller 121. The memory 123 may be configured to store a software program and an application module. By running the software program and the application module that are stored in the memory 123, the controller 121 executes various operation instructions and processes response data. The memory 123 mainly includes a program storage area. The program storage area may store an operating system and an application program required by at least one function, for example, an application program required for executing each operation instruction.

As shown in FIG. 1, the controller 121, the flash memory array 122, the memory 123, and the communications interface 124 may be connected to each other by using the bus 125.

The solid state disk 12 performs management in an address space virtualization manner. All flash memory chips are logically divided into a plurality of groups, each flash memory chip group includes at least one flash memory chip, each flash memory chip includes a plurality of physical blocks, a flash memory chip in each flash memory chip group forms a LUN, and each flash memory chip belongs to one LUN. A physical block in any flash memory chip in a different group forms a logical block, and physical blocks in each logical block are different physical blocks in different flash memory chips. The flash memory chip to which each physical block in the logical block belongs includes the LUN.

Figure 2:
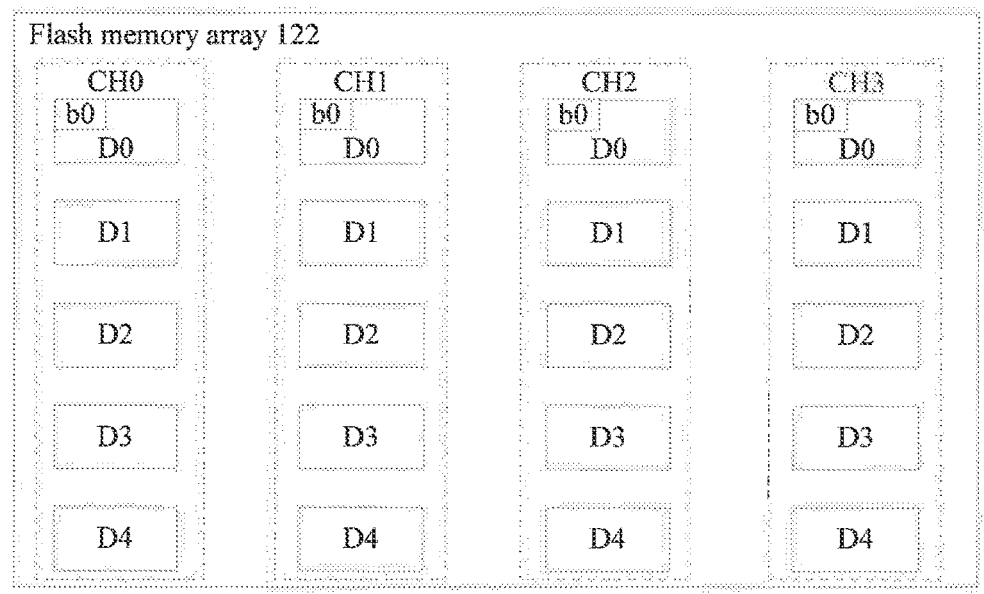
FIG. 2 is a schematic structural diagram of a flash memory array according to an embodiment of the present application.

A flash memory array structure shown in FIG. 2 is used as an example for description. As shown in FIG. 2, the flash memory array 122 includes 20 flash memory chips, and the flash memory chips are divided into four groups. Numbers of the four groups respectively are CH0, CH1, CH2, and CH3. Each group includes five flash memory chips, and all flash memory chips in each group are numbered D0, D1, D2, D3, and D4. Physical blocks included in each flash memory chip are numbered in a same manner. As shown in FIG. 2, a flash memory chip numbered D0 in each group includes a physical block with a same number of b0. In the structure shown in FIG. 2, according to a setting that physical blocks having a same number in flash memory chips having a same number in groups form a logical block, it may be determined that physical blocks having a number of b0 that are included in flash memory chips having a number of D0 in groups form a logical block. A number of the logical block is set to K1. To be specific, the logical block K1 includes a physical block b0 included in a chip D0 in the group CH0, a physical block b0 included in a chip D0 in the group CH1, a physical block b0 included in a chip D0 in the group CH2, and a physical block b0 included in a chip D0 in the group CH3. Further, it may be concluded that the chip D0 in the group CH0, the chip D0 in the group CH1, the chip D0 in the group CH2, and the chip D0 in the group CH3 form one LUN.

Because the physical block that is to be accessed when the controller 121 executes the I/O read command is determined by the host 11, the controller 121 may determine, based on information in the I/O read command, the physical block that is to be accessed when the controller 121 executes the I/O read command. For the operation commands of the I/O write command, the GC write command, and the GC read command, the controller 121 may determine, based on a data storage amount and a data storage type in the physical block and the flash memory chip in the flash memory array 122, a physical block that is to be accessed when the operation commands are executed. Therefore, the physical block that is to be accessed when the controller 121 executes the I/O read command is passively determined. When executing the I/O write command, the GC write command, and the GC read command, the controller 121 may actively determine a physical block that is to be accessed when the controller 121 executes the I/O write command, the GC write command, and the GC read command.

After receiving the operation command, the controller 121 first determines a target logical block that is to be accessed when the operation command is executed, then determines, from each physical block included in the target logical block, the target physical block that is to be accessed when the operation command is executed, and stores the operation command in a processing waiting queue corresponding to a flash memory chip to which the target physical block belongs. Because the operation commands in the processing waiting queue corresponding to the flash memory chip are sequentially processed in the sequence in which the operation commands are stored, to avoid a case in which a plurality of other operation commands are stored in a processing waiting queue corresponding to a flash memory chip to which a target physical block that is to be accessed when the I/O read command is executed belongs, a delay of the I/O read command of the host 11 is increased, and communication efficiency of the host 11 is reduced. In this embodiment of the present application, when determining a target physical block that is to be accessed when the operation commands including the I/O write command, the GC write command, and the GC read command are executed, the controller 121 may determine that a physical block in a flash memory chip corresponding to a processing waiting queue that stores no operation command that waits to be processed is the physical block that is to be accessed when the I/O write command, the GC write command, and the GC read command are executed. In this way, the processing waiting queue corresponding to the flash memory chip to which the target physical block that is to be accessed when the I/O read command is executed belongs may store at most another one operation command other than the I/O read command. Therefore, the delay of the I/O read command of the host 11 can be reduced, and the communication efficiency of the host 11 can be improved.

The controller 121 may store working states of all LUNs. The working states of the LUNs include an idle state and a non-idle state. The idle state indicates that a quantity of operation commands that wait to be processed in a processing waiting queue respectively corresponding to each flash memory chip in a LUN is less than or equal to a preset threshold. For example, when a quantity of operation commands that wait to be processed in a processing waiting queue respectively corresponding to each flash memory chip in a LUN is zero, it may be determined that a working state of the LUN is the idle state. The non-idle state indicates that a quantity of operation commands that wait to be processed in a processing waiting queue corresponding to at least one flash memory chip in a LUN is greater than the preset threshold. For example, when none of quantities of operation commands that wait to be processed in processing waiting queues respectively corresponding to each flash memory chip in the LUN is zero, in other words, when a quantity of operation commands that wait to be processed in a processing waiting queue respectively corresponding to each flash memory chip in a LUN is greater than 0, it may be determined that a working state of the LUN is the non-idle state. Therefore, a physical block in a flash memory chip included in the LUN in the idle state is a target physical block that is to be accessed when the operation command is executed in this embodiment of the present application. In other words, a logical block including a physical block in a chip included in the LUN in the idle state is a target logical block that is to be accessed when the operation command is executed in this embodiment of the present application.

Optionally, if the controller 121 needs to determine the target physical block that is to be accessed when the operation command is executed, the controller 121 first determines one or more target logical blocks in the idle state, determines a target LUN in an idle state based on a quantity of operation commands that wait to be processed in a processing waiting queue corresponding to a flash memory chip to which each physical block in each target logical block belongs, and then determines, from the target LUN, the target physical block that is to be accessed when the operation command is executed. If the controller stores working state parameters of all LUNs, the controller can determine the target LUN in the idle state by querying the working state parameter of the LUN. The working state parameter of the LUN is used to indicate a working state of the LUN.

The controller 121 stores a working state parameter of the LUN by using a LUN state table, and stores a value of the working state parameter of each LUN in the LUN state table. For example, if a value of the working state parameter is set to 1, it indicates that a working state of the LUN is the idle state. A parameter value of 0 indicates that a working state of the LUN is the non-idle state. In this case, by querying the LUN state table, a value of a working state parameter of each LUN can be queried. In other words, the working state of the LUN can be determined.

Figure 3:
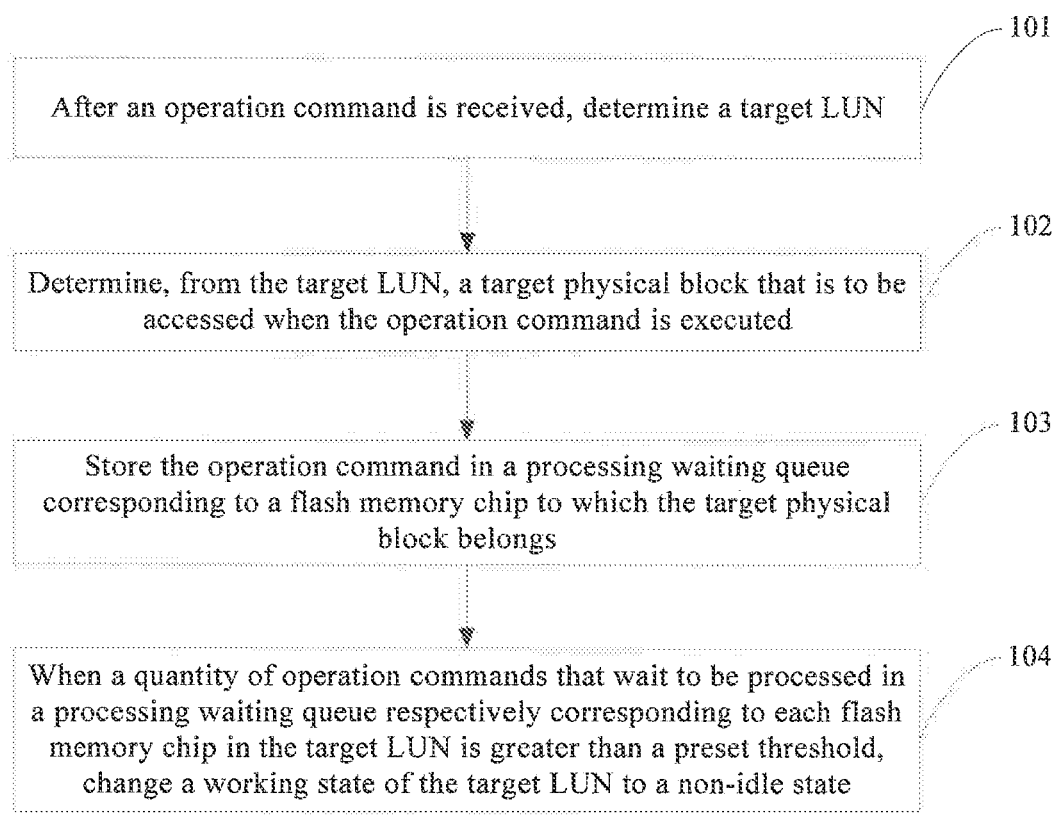
FIG. 3 is a schematic flowchart of a method for executing a hard disk operation command according to an embodiment of the present application.

An embodiment of the present application provides a method for executing a hard disk operation command. The method may be applied to the hard disk 12 shown in FIG. 1, and may be specifically performed by the controller 121 in the hard disk 12. As shown in FIG. 3, the method includes the following steps.

101. After an operation command is received, determine a target LUN.

A working state of the target LUN is an idle state. When the target LUN is in the idle state, a quantity of operation commands that wait to be processed in a processing waiting queue respectively corresponding to each flash memory chip in the target LUN is less than or equal to a preset threshold.

Specifically, when determining the target LUN, the controller 121 may query a LUN state table to determine the target LUN that has the working state parameter whose value indicates the idle state.

Before determining the target LUN, the controller 121 may alternatively first determine one or more target logical blocks whose operation states are the idle state. When the target logical block is in the idle state, a processing waiting queue respectively corresponding to a flash memory chip to which each physical block in the target logical block belongs does not include another operation command that is to be executed when any physical block in the target logical block is accessed. After determining the target logical block whose operation state is the idle state, the controller 121 may further determine, based on the target logical block, whether a LUN including a flash memory chip to which each physical block in the target logical block belongs is the target LUN.

A specific implementation of determining, based on the target logical block, whether the LUN including the flash memory chip to which each physical block in the target logical block belongs is the target LUN is as follows: The LUN state table is queried, whether a value of the working state parameter of the LUN including the flash memory chip to which each physical block in the target logical block belongs indicates the idle state. If the value indicates the idle state, the LUN including the flash memory chip to which each physical block in the target logical block belongs is the target LUN.

Another specific implementation of determining, based on the target logical block, whether a LUN including a flash memory chip to which each physical block in the target logical block belongs is the target LUN is as follows: It is queried whether a quantity of operation commands that wait to be processed in a processing waiting queue corresponding to each flash memory chip in the LUN including the flash memory chip to which each physical block in the target logical block belongs is less than or equal to a preset threshold. If the quantity of operation commands is less than or equal to the preset threshold, the LUN including the flash memory chip to which each physical block in the target logical block belongs is the target LUN.

If there are a plurality of determined target logical blocks, and LUNs including flash memory chips to which physical blocks in target logical blocks belong are a plurality of different LUNs, there may be a plurality of LUNs that are in the idle state and that are determined from the plurality of different LUNs based on the foregoing two implementations of determining the target LUN, and one LUN in the idle state is selected as the target LUN.

It should be noted that the controller 121 may further store an operation state parameter of a logical block, wherein the operation state parameter is used to indicate whether the operation state of the logical block is the idle state, and operation states include the idle state and a non-idle state. In the operation states of the logical block, the idle state indicates that a processing waiting queue respectively corresponding to a flash memory chip to which each physical block in the logical block belongs does not include another operation command that is to be executed when any physical block in the target logical block is accessed, and the non-idle state indicates that a processing waiting queue respectively corresponding to a flash memory chip to which at least one physical block in the logical block belongs includes another operation command that is to be executed when any one or more physical blocks in the target logical block are accessed. A manner in which the controller 121 stores the operation state of the logical block may be a manner of storing a logical block operation state table. The logical block operation state table stores an operation state parameter value of each logical block. The operation state parameter of the logical block is used to indicate the operation state of the logical block.

Operation commands in this embodiment of the present application include an I/O write command, a garbage collection write command, or a garbage collection read command. An I/O write command received by the controller 121 is delivered by the host. The I/O write command, a GC read command, and a GC write command that are received by the controller 121 are triggered when a storage state of a storage array meets a garbage collection policy, or are triggered after the host 11 delivers a garbage collection instruction to the solid state disk 12 after a user enters the garbage collection instruction of the user, or are triggered when the host 11 detects a storage need of an application program of a client. For example, the host 11 periodically sends the garbage collection instruction to the solid state disk 12. When receiving the garbage collection instruction, the solid state disk 12 generates the GC read command and the GC write command.

In an optional implementation of this embodiment of the present application, the I/O write command or the GC write command belongs to a write type of operation command, and the GC read command belongs to a read type of operation command. After receiving the operation command of the I/O write command or the GC write command, the controller 121 does not first determine a target LUN, but instead the controller 121 first queries whether a logical block that is accessed when a same write type of operation command is executed last time can continue to be accessed. If the logical block can continue to be accessed, it is queried whether the target logical block is full. If the target logical block is not full, the target logical block continues to be accessed by using a page as a granularity; or if the logical block cannot continue to be accessed, the target LUN is determined by using step 101, and a physical block is selected from the target LUN to be accessed when the I/O write command or the GC write command is executed. If the operation command received by the controller 121 is the GC read command, or the operation command received by the controller 121 is the I/O write command or the GC write command, and it is detected, through a query, that the logical block that is accessed when a same type of operation command is executed last time cannot continue to be accessed, the controller 121 can determine the target LUN by querying the LUN state table in step 101, or first determine one or more new target logical blocks, and then determine the target LUN from one or more LUNs respectively determined based on the one or more target logical blocks. An operation state of the target logical block is the idle state, and a working state of the target LUN is the idle state. A target physical block that is to be accessed when a currently received operation command is executed is determined from a new target LUN.

If the operation command is the I/O write command or the GC write command, the target physical block that is to be accessed when the operation command is executed and that is determined in this step is a new block. When the operation command is the I/O write command or the GC write command, the new block represents a physical block that is not full of written data. The physical block that is not full of written data includes a physical block into which no data is written, a physical block in which written data has been cleared, or a physical block that is not full. The I/O write command or the GC write command is a same write type of operation command, and the GC read command is a read type of operation command.

102. Determine, from the target LUN, a target physical block that is to be accessed when the operation command is executed.

If the operation command is the I/O write command or the GC write command, the controller 121 may determine any new block from the target LUN, so that when executing the I/O write command or the GC write command, the controller 121 writes data into any new block determined from the target LUN. If the operation command is the GC read command, the controller 121 may determine, from the target LUN, a physical block including only garbage pages, so that when executing the GC read command, the controller 121 reads garbage data from the physical block that includes only the garbage pages and that is determined from the target LUN.

103. Store the operation command in a processing waiting queue corresponding to a flash memory chip to which the target physical block belongs.

After the controller 121 determines the target physical block in step 102, the controller 121 stores the operation command in the processing waiting queue corresponding to the flash memory chip to which the target physical block belongs, so that the controller 121 processes the operation command.

104. When a quantity of operation commands that wait to be processed in a processing waiting queue respectively corresponding to each flash memory chip in the target LUN is greater than a preset threshold, change a working state of the target LUN to a non-idle state.

After the operation command is stored in the processing waiting queue corresponding to the flash memory chip to which the target physical block belongs, a quantity of operation commands that wait to be processed in a processing waiting queue respectively corresponding to each flash memory chip in the target LUN is queried, and if the quantity of operation commands that wait to be processed in the processing waiting queue respectively corresponding to each flash memory chip in the target LUN is greater than the preset threshold, the working state of the target LUN is changed to the non-idle state. For example, if the threshold is 0, after the operation command is stored in the processing waiting queue corresponding to the flash memory chip to which the target physical block belongs, the quantity of operation commands that wait to be processed in the processing waiting queue corresponding to the flash memory chip to which the target physical block belongs is no longer zero, and the working state of the target LUN that includes the flash memory chip to which the target physical block belongs is converted to the non-idle state. Therefore, the working state of the target LUN is changed to the non-idle state. When the controller 121 stores a LUN state table, a value of a working state parameter of the target LUN needs to be changed. A changed value of the working state parameter of the target LUN indicates that the target LUN is in the non-idle state, to ensure accuracy of the LUN state table.

It should be noted that when operation states of all logical blocks in the target LUN are the idle state, the controller 121 may further change a value of the working state parameter of the target LUN to the value that indicates the idle state.

The logical block in the target LUN represents a logical block including any physical block in each flash memory chip included in the target LUN. When the operation states of all the logical blocks in the target LUN are the idle state, it indicates that there is no other operation command that needs to be executed when any physical block in the target logical block is accessed, and further, it indicates that a quantity of operation commands that wait to be processed in the processing waiting queue corresponding to the flash memory chip included in the target LUN is zero. In other words, the target LUN is in the idle state. Therefore, the working state of the target LUN may be changed to the idle state. When the controller 121 stores the LUN state table, a value of the working state parameter of the target LUN may be changed to the value that indicates the idle state, to ensure accuracy of the LUN state table.

In this embodiment of the present application, after receiving the operation command, the controller 121 in the hard disk may first determine the target LUN whose working state is the idle state, and then determine, from the target LUN whose working state is the idle state, the target physical block that is to be accessed when the operation command is executed. Because the quantity of operation commands that wait to be processed in the processing waiting queue respectively corresponding to each flash memory chip in the target LUN is less than or equal to the preset threshold when the target LUN is in the idle state, in this case, in this embodiment of the present application, the processing waiting queue corresponding to the flash memory chip to which the target physical block that is accessed according to the I/O read command belongs includes a relatively small quantity of other operation commands, so that a delay of an I/O read command of a client can be reduced, and data reading communication efficiency of the client can be improved.

If the preset threshold is zero, after the controller 121 completes execution of the operation command, execution of an operation command of a physical block in the to-be-accessed target logical block in the processing waiting queue corresponding to the flash memory chip to which the target physical block belongs is completed. Therefore, the operation state of the target logical block is converted to the idle state, and the operation state of the target logical block may be changed to the idle state. When the controller 121 stores an operation state table of the logical block, a value of an operation state parameter of the target logical block needs to be changed to the value that indicates the idle state.

Figure 4:
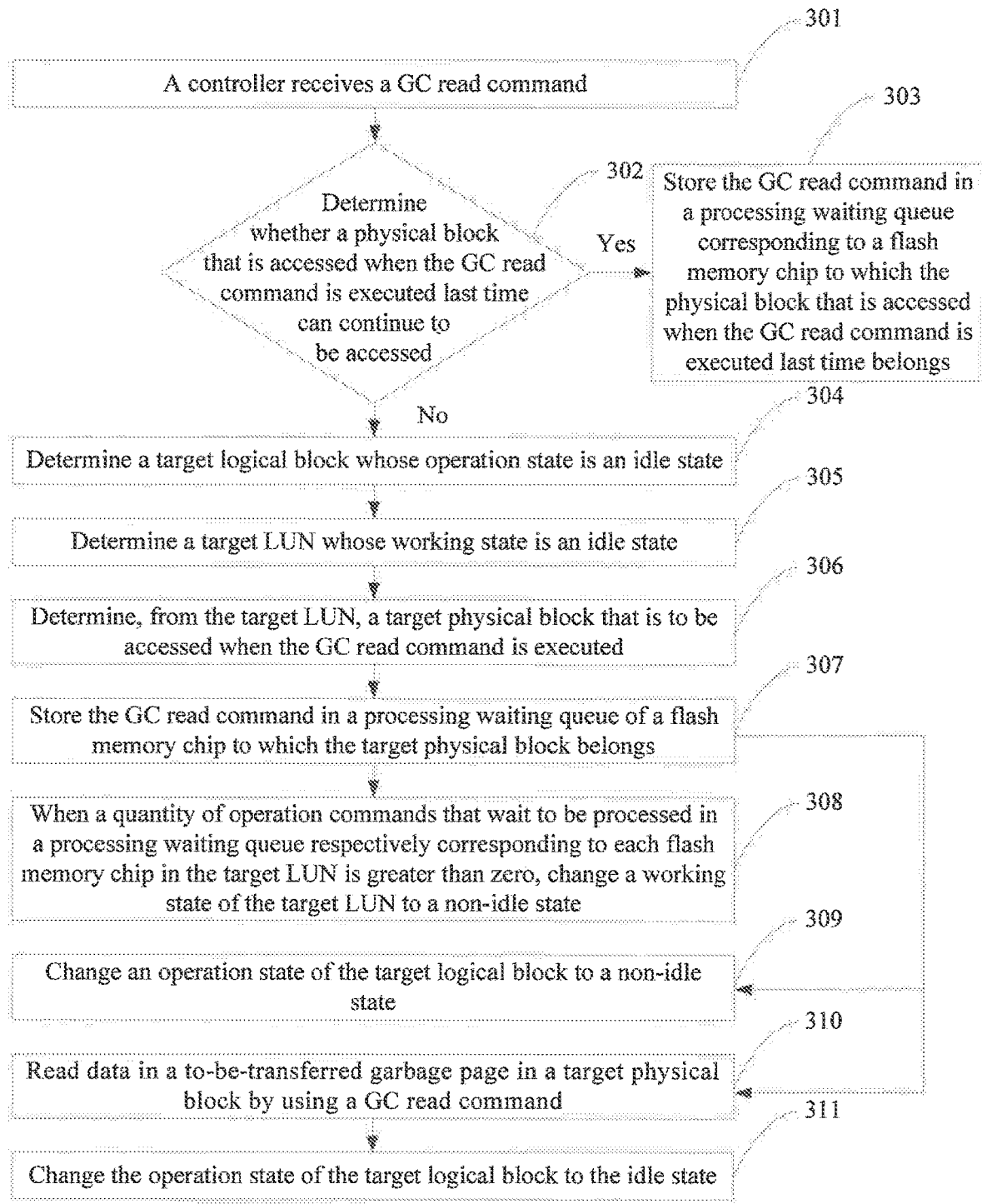
FIG. 4 is a schematic flowchart of another method for executing a hard disk operation command according to an embodiment of the present application.

Specifically, when the operation command is the GC read command, that the preset threshold is equal to zero is used as an example. As shown in FIG. 4, the embodiment shown in FIG. 3 may be specifically implemented by performing the following steps.

301. A controller 121 receives the GC read command.

The GC read command is triggered when the controller 121 performs garbage collection. After receiving the GC read command, the controller 121 reads, by using the GC read command, data in a physical block that is to be accessed when the GC read command is executed.

302. Determine whether a physical block that is accessed when the GC read command is executed last time can continue to be accessed, and if the physical block that is accessed when the GC read command is executed last time cannot continue to be accessed, perform step 304, or if the physical block that is accessed when the GC read command is executed last time can continue to be accessed, perform step 303.

Before a to-be-cleared physical block is cleared, data in a to-be-transferred garbage page needs to be first transferred and stored in another physical block. Therefore, data in the to-be-transferred garbage page needs to be first read by using the GC read command. When all data in a to-be-transferred garbage page in the physical block that is accessed when the GC read command is executed last time is read, a subsequent operation, such as clearing, is performed on the to-be-transferred garbage page. In this case, the physical block that is accessed when the GC read command is executed last time cannot continue to be accessed. The controller 121 can further determine a target physical block that is to be accessed when the GC read command received in step 301 is executed. In other words, step 304 is performed. When all the data in the to-be-transferred garbage page in the physical block that is accessed when the GC read command is executed last time is not read, remaining data in the physical block needs to continue to be read. In this case, the physical block that is accessed when the GC read command is executed last time can continue to be accessed. The controller 121 may determine that the physical block is the target physical block that is to be accessed when the GC read command is executed. Step 303 is performed.

303. Store the GC read command in a processing waiting queue corresponding to a flash memory chip to which the physical block that is accessed when the GC read command is executed last time belongs.

The controller 121 stores the GC read command in the physical block that is accessed when the GC read command is executed last time and that is determined as the target physical block, and stores the GC read command in the processing waiting queue of the flash memory chip to which the physical block that is accessed when the GC read command is executed last time belongs.

304. Determine a target logical block whose operation state is an idle state.

When the target logical block is in the idle state, a processing waiting queue respectively corresponding to a flash memory chip to which each physical block in the target logical block belongs does not include another operation command that is to be executed when any physical block in the target logical block is accessed. The controller 121 may determine the target logical block by using the operation state table of the logical block.

305. Determine a target LUN whose working state is an idle state.

When the target LUN is in the idle state, a quantity of operation commands that wait to be processed in a processing waiting queue respectively corresponding to each flash memory chip in the target LUN is zero. After determining the target logical block, the controller 121 may determine the target LUN in the idle state based on a quantity of operation commands that wait to be processed in a processing waiting queue corresponding to a flash memory chip to which each physical block in each target logical block belongs.

In this step, the controller 121 may further determine, by using a LUN state table, the target LUN whose working state is the idle state, without a need to perform step 304.

306. Determine, from the target LUN, a target physical block that is to be accessed when the GC read command is executed.

The controller 121 may determine, from the target LUN, a physical block including only garbage pages, so that when executing the GC read command, the controller 121 reads garbage data from the physical block that includes only the garbage pages and that is determined from the target LUN.

307. Store the GC read command in a processing waiting queue of the flash memory chip to which the target physical block belongs.

308. When a quantity of operation commands that wait to be processed in a processing waiting queue respectively corresponding to each flash memory chip in the target LUN is greater than zero, change the working state of the target LUN to a non-idle state.

After the GC read command is stored in the processing waiting queue corresponding to the flash memory chip to which the target physical block belongs, the quantity of operation commands that wait to be processed in the processing waiting queue corresponding to the flash memory chip to which the target physical block belongs is no longer zero. Therefore, when the quantity of operation commands that wait to be processed in the processing waiting queue respectively corresponding to each flash memory chip in the target LUN is greater than zero, the working state of the target LUN is changed to the non-idle state.

309. Change the operation state of the target logical block to the non-idle state.

Because a processing waiting queue corresponding to a flash memory chip to which a target physical block in the target logical block belongs includes an operation command of a physical block in the to-be-accessed target logical block, an operation state of the target logical block is converted to the non-idle state, and the operation state of the target logical block may be changed to the non-idle state.

310. Read data in a to-be-transferred garbage page in a target physical block by using a GC read command.

It should be noted that there the sequence for performing step 308, step 309, and step 310 may be in any order.

311. Change the operation state of the target logical block to the idle state.

After the controller 121 completes execution of the GC read command, execution of a GC read command of a physical block in the to-be-accessed target logical block in the processing waiting queue corresponding to the flash memory chip to which the target physical block belongs is completed. Therefore, the operation state of the target logical block is converted to the idle state, and the operation state of the target logical block may be changed to the idle state.

Figure 5:
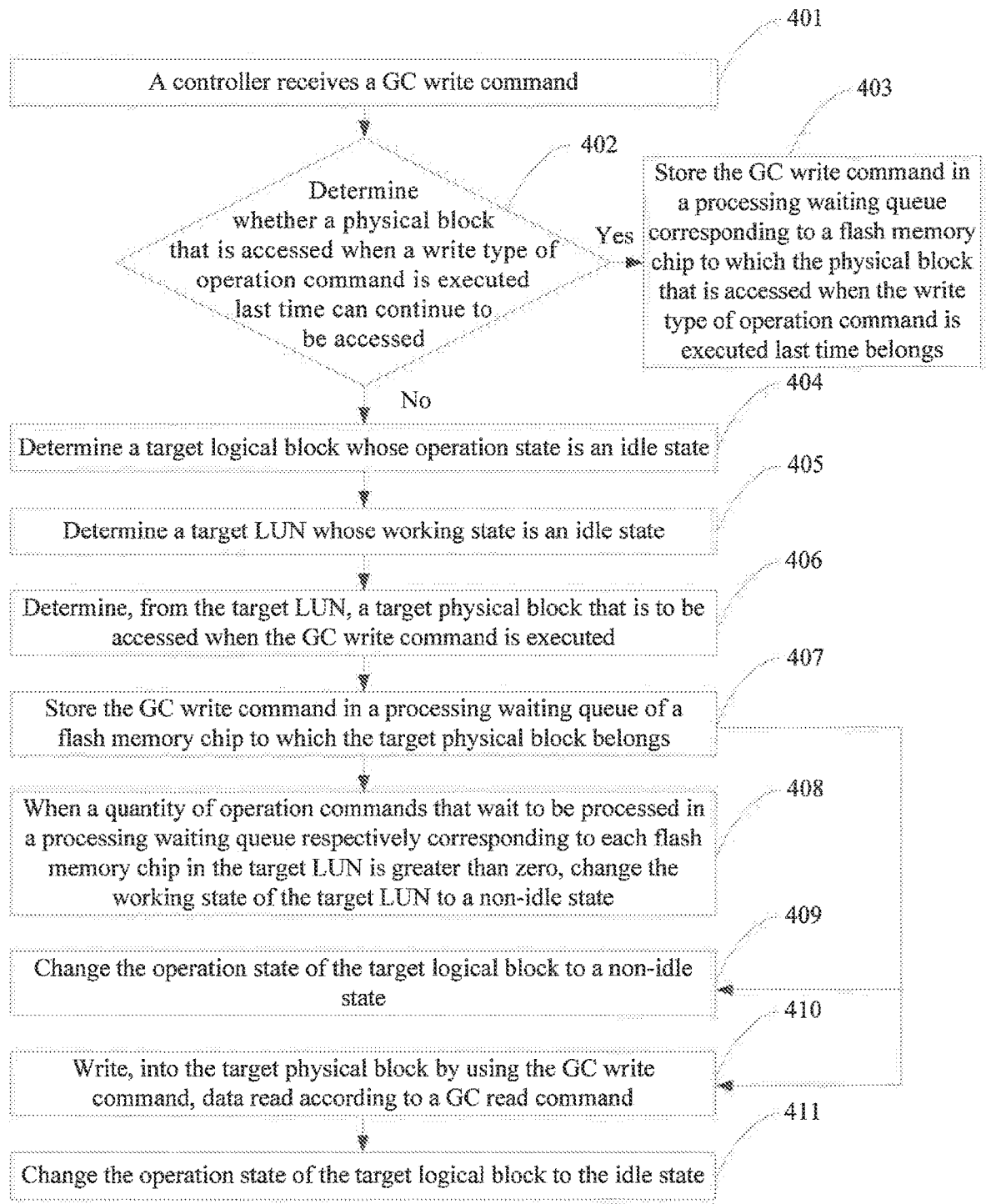
FIG. 5 is a schematic flowchart of still another method for executing a hard disk operation command according to an embodiment of the present application.

Specifically, when the operation command is the GC write command, that the preset threshold is equal to zero is used as an example. As shown in FIG. 5, the embodiment shown in FIG. 3 may be specifically implemented by performing the following steps.

401. A controller 121 receives the GC write command.

When performing garbage collection, the controller 121 reads data in a to-be-cleared physical block by using a GC read command, and then the GC write command is triggered. After receiving the GC write command, the controller 121 writes, into another physical block by using the GC write command, the data read according to the GC read command.

402. Determine whether a physical block that is accessed when the write type of operation command is executed last time can continue to be accessed, and if the physical block that is accessed when the GC read command is executed last time cannot continue to be accessed, perform step 404, or if the physical block that is accessed when the GC read command is executed last time can continue to be accessed, perform step 403.

After receiving the GC write command, the controller 121 needs to first determine whether the physical block that is accessed when the write type of operation command is executed last time can continue to be accessed. For example, the controller 121 determines whether the physical block is full. If the physical block that is accessed when the write type of operation command is executed last time cannot continue to be accessed, to be specific, the physical block is full, a target physical block that is to be accessed when the to-be-executed GC write command is executed may be further determined, and step 404 is performed. If the physical block that is accessed when the write type of operation command is executed last time can continue to be accessed, to be specific, the physical block is not full, a physical block that is accessed when a write command is executed last time is determined as the target physical block that is to be accessed when the GC write command received in step 401 is executed, and step 403 is performed.

403. Store the GC write command in a processing waiting queue corresponding to a flash memory chip to which the physical block that is accessed when the write type of operation command is executed last time belongs.

The controller 121 stores the GC write command in the physical block that is accessed when the write type of operation command is executed last time and that is determined as the target physical block, and stores the GC write command in the processing waiting queue of the flash memory chip to which the physical block that is accessed when the write type of operation command is executed last time belongs.

404. Determine a target logical block whose operation state is an idle state.

When the target logical block is in the idle state, a processing waiting queue respectively corresponding to a flash memory chip to which each physical block in the target logical block belongs does not include another operation command that is to be executed when any physical block in the target logical block is accessed. The controller 121 may determine the target logical block by using the operation state table of the logical block.

405. Determine a target LUN whose working state is an idle state.

When the target LUN is in the idle state, a quantity of operation commands that wait to be processed in a processing waiting queue respectively corresponding to each flash memory chip in the target LUN is zero. After determining the target logical block, the controller 121 may determine the target LUN in the idle state based on a quantity of operation commands that wait to be processed in a processing waiting queue corresponding to a flash memory chip to which each physical block in each target logical block belongs.

406. Determine, from the target LUN, a target physical block that is to be accessed when the GC write command is executed.

The controller 121 may determine any new block from the target LUN as a target physical block to write data of the GC write command.

407. Store the GC write command in a processing waiting queue of the flash memory chip to which the target physical block belongs.

408. When a quantity of operation commands that wait to be processed in a processing waiting queue respectively corresponding to each flash memory chip in the target LUN is greater than zero, change the working state of the target LUN to a non-idle state.

After the GC write command is stored in the processing waiting queue corresponding to the flash memory chip to which the target physical block belongs, the quantity of operation commands that wait to be processed in the processing waiting queue corresponding to the flash memory chip to which the target physical block belongs is no longer zero. Therefore, when the quantity of operation commands that wait to be processed in the processing waiting queue respectively corresponding to each flash memory chip in the target LUN is greater than zero, the working state of the target LUN is changed to the non-idle state.

409. Change the operation state of the target logical block to the non-idle state.

410. Write, into the target physical block by using the GC write command, data read according to a GC read command.

It should be noted that the sequence for performing step 408, step 409, and step 410 may be in any order.

411. Change the operation state of the target logical block to the idle state.

After the controller 121 completes execution of the GC write command, execution of a GC write command of a physical block in the to-be-accessed target logical block in the processing waiting queue corresponding to the flash memory chip to which the target physical block belongs is completed. Therefore, the operation state of the target logical block is converted to the idle state, and the operation state of the target logical block may be changed to the idle state.

Figure 6:
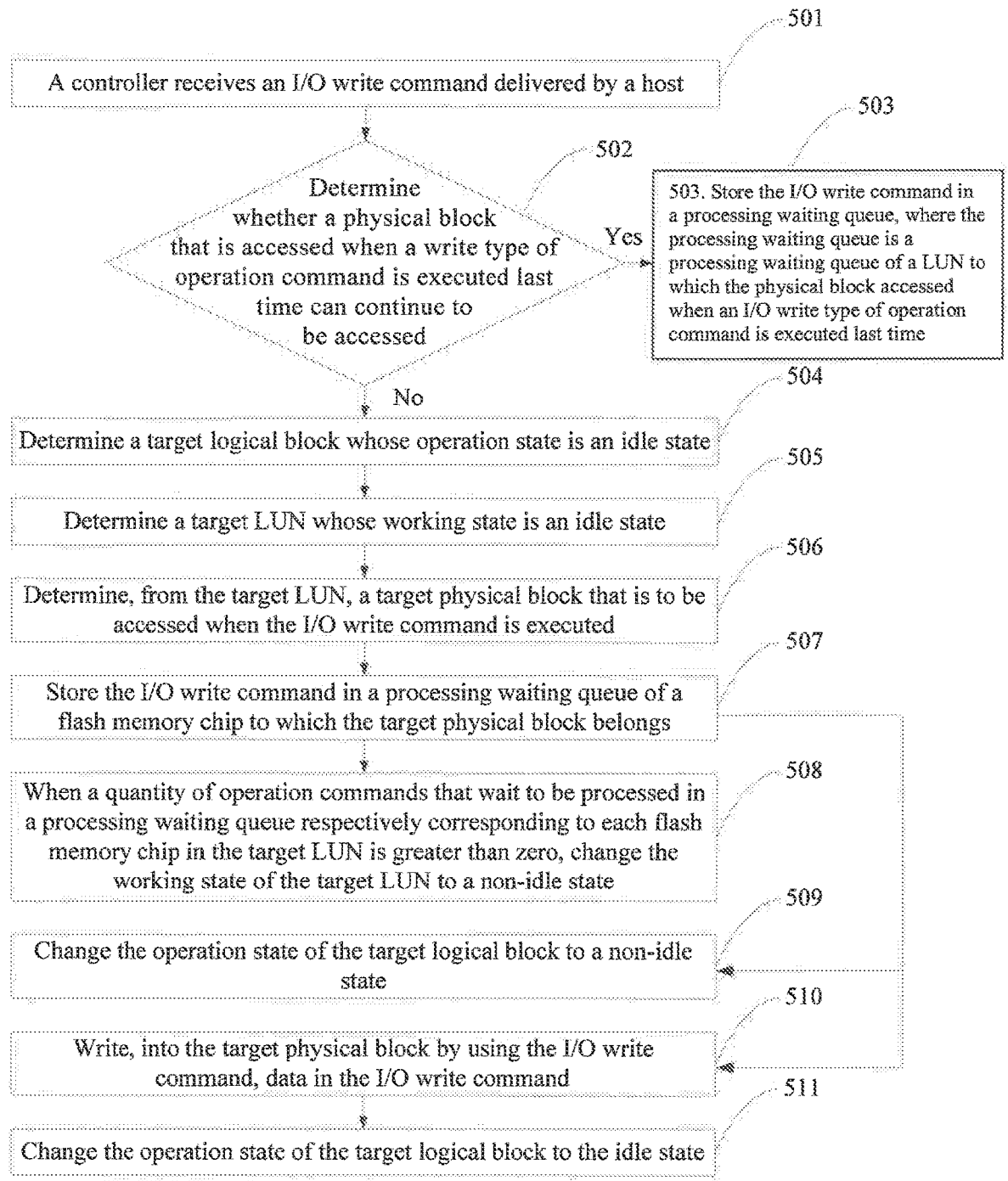
FIG. 6 is a schematic flowchart of yet another method for executing a hard disk operation command according to an embodiment of the present application.

Specifically, when the operation command is the I/O write command, which the preset threshold is equal to zero is used as an example. As shown in FIG. 6, the embodiment shown in FIG. 3 may be specifically implemented by performing the following steps.

501. A controller 121 receives an I/O write command delivered by a host 11.

502. Determine whether a physical block that is accessed when the write type of operation command is executed last time can continue to be accessed, and if the physical block that is accessed when the GC read command is executed last time cannot continue to be accessed, perform step 504, or if the physical block that is accessed when the GC read command is executed last time can continue to be accessed, perform step 503.

After receiving the I/O write command delivered by the host 11, the controller 121 needs to first determine whether the physical block that is accessed when the write type of operation command is executed last time can continue to be accessed. For example, the controller 121 determines whether the physical block is full. If the physical block that is accessed when the write type of operation command is executed last time cannot continue to be accessed, to be specific, the physical block is full, a target physical block that is to be accessed when the I/O write command is executed may be further determined, and step 504 is performed. If the physical block that is accessed when the write type of operation command is executed last time can continue to be accessed, to be specific, the physical block is not full, a physical block that is accessed when a write command is executed last time is determined as the target physical block that is to be accessed when the I/O write command received in step 401 is executed, and step 503 is performed.

503. Store the I/O write command in a processing waiting queue, where the processing waiting queue is a processing waiting queue of a LUN to which the physical block accessed when an I/O write type of operation command is executed last time.

The controller 121 stores the I/O write command in the physical block that is accessed when the write type of operation command is executed last time and that is determined as the target physical block, and stores the I/O write command in the processing waiting queue of the flash memory chip to which the physical block that is accessed when the write type of operation command is executed last time belongs.

504. Determine a target logical block whose operation state is an idle state.

When the target logical block is in the idle state, a processing waiting queue respectively corresponding to a flash memory chip to which each physical block in the target logical block belongs does not include another operation command that is to be executed when any physical block in the target logical block is accessed. The controller 121 may determine the target logical block by using an operation state table of the logical block.

505. Determine a target LUN whose working state is an idle state.

When the target LUN is in the idle state, a quantity of operation commands that wait to be processed in a processing waiting queue respectively corresponding to each flash memory chip in the target LUN is zero. After determining the target logical block, the controller 121 may determine the target LUN in the idle state based on a quantity of operation commands that wait to be processed in a processing waiting queue corresponding to a flash memory chip to which each physical block in each target logical block belongs.

506. Determine, from the target LUN, a target physical block that is to be accessed when the I/O write command is executed.

The controller 121 may determine any new block from the target LUN as a target physical block to write data of the I/O write command.

507. Store the I/O write command in a processing waiting queue of the flash memory chip to which the target physical block belongs.

508. When a quantity of operation commands that wait to be processed in a processing waiting queue respectively corresponding to each flash memory chip in the target LUN is greater than zero, change the working state of the target LUN to a non-idle state.

After the I/O write command is stored in the processing waiting queue corresponding to the flash memory chip to which the target physical block belongs, the quantity of operation commands that wait to be processed in the processing waiting queue corresponding to a flash memory chip to which the target physical block belongs is no longer zero. Therefore, when the quantity of operation commands that wait to be processed in the processing waiting queue respectively corresponding to each flash memory chip in the target LUN is greater than zero, the working state of the target LUN is changed to the non-idle state.

509. Change the operation state of the target logical block to the non-idle state.

510. Write, into the target physical block by using the I/O write command, data in the I/O write command.

It should be noted that the sequence for performing step 508, step 509, and step 510 may be in any order.

511. Change the operation state of the target logical block to the idle state.

After the controller 121 completes execution of the I/O write command, execution of an I/O write command of a physical block in the to-be-accessed target logical block in the processing waiting queue corresponding to the flash memory chip to which the target physical block belongs is completed. Therefore, the operation state of the target logical block is converted to the idle state, and the operation state of the target logical block may be changed to the idle state.

It should be noted that a principle of the methods shown in FIG. 4, FIG. 5, and FIG. 6 is the same as a data processing principle of the embodiment shown in FIG. 3. For details, refer to the embodiment shown in FIG. 3.

In this embodiment of the present application, the methods shown in FIG. 4, FIG. 5, and FIG. 6 separately describe processes in which the controller 121 determines, when processing the I/O write command, the GC read command, and the GC write command, target physical blocks that are to be accessed when the I/O write command, the GC read command, and the GC write command are executed. In this way, the processing waiting queue corresponding to the flash memory chip to which the target physical block that is to be accessed when the I/O read command is executed belongs stores at most another one operation command. Therefore, a delay of the I/O read command of the client can be reduced, and communication efficiency of the client can be improved.

An embodiment of the present application provides a hard disk 600, where the hard disk 600 includes a controller and at least two flash memory chip groups, each flash memory chip group includes at least one flash memory chip, each flash memory chip includes a plurality of physical blocks, any flash memory chip in each flash memory chip group forms a LUN, flash memory chips that are in a same flash memory chip group and that are located in different LUNs are different.

The controller in the hard disk 600 is configured to perform steps performed by the controller 121 in the foregoing method for executing a hard disk operation command. The controller provided in this embodiment of the present application may include a module corresponding to a corresponding step.

In the embodiments of the present application, function modules of the controller may be obtained through division based on the foregoing method examples. For example, the function modules may be obtained through division corresponding to various functions, or two or more functions may be integrated into one processing module. The integrated module may be implemented in a form of hardware, or may be implemented in a form of a software function module. In this embodiment of the present application, module division is an example, and is merely a logical function division. In actual implementation, another division manner may be used.

Figure 7:
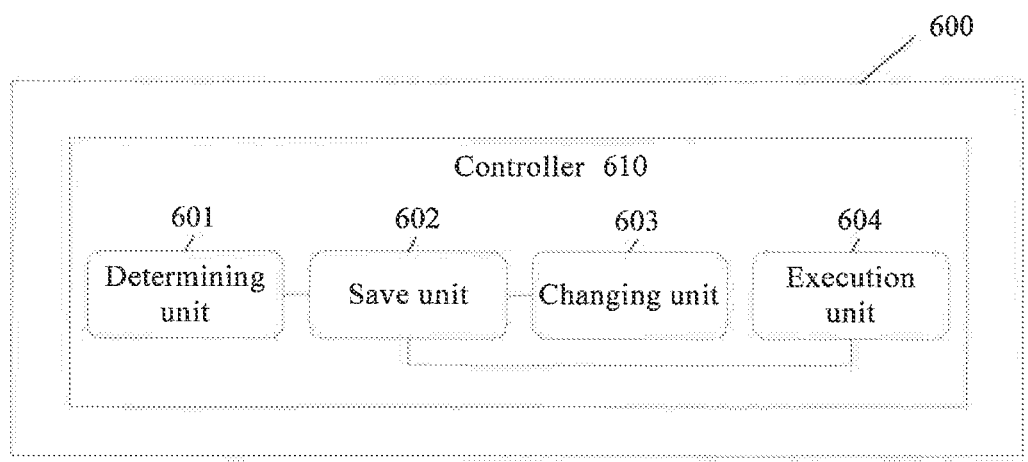
FIG. 7 is a schematic block diagram of a hard disk according to an embodiment of the present application.

When function modules are obtained through division corresponding to various functions. FIG. 7 is a possible schematic structural diagram of a hard disk 600 in the foregoing embodiment (at least two flash memory chip groups included in the hard disk 600 are not shown in FIG. 7). As shown in FIG. 7, a controller 610 includes a determining unit 601, a save unit 602, a changing unit 603, and an execution unit 604. The determining unit 601 is configured to support the controller 610 in performing step 101 and step 102 in the embodiment shown in FIG. 3, and/or is configured to perform other processes of the technology described in this specification. The save unit 602 is configured to support the controller 610 in performing step 103 in the embodiment shown in FIG. 3, and/or is configured to perform other processes of the technology described in this specification. The changing unit 603 is configured to: support the controller 610 in performing step 104 in the embodiment shown in FIG. 3, change an operation state of a target logical block to a non-idle state, change an operation state of the target logical block to an idle state after an operation command is executed, and change a value of a working state parameter of a target LUN to the value that indicates an idle state when operation states of all logical blocks in the target LUN are the idle state, and/or is configured to perform other processes of the technology described in this specification. The execution unit 604 is configured to execute an operation command, and/or is configured to perform other processes of the technology described in this specification. All content related to the steps in the foregoing method embodiments may be cited in function description of corresponding function modules. Details are not described herein again. Certainly, the controller 610 provided in this embodiment of the present application includes but is not limited to the foregoing modules. For example, the controller 610 may further include a receiving unit and a storage unit. The receiving unit is configured to communicate with another device. For example, the receiving unit is configured to communicate with a host. The storage unit may be configured to store program code of the controller.

When an integrated unit is used, the determining unit 601, the save unit 602, the changing unit 603, and the execution unit 604 in this embodiment of this application may be the controller 121 in FIG. 1, the receiving unit may be the communications interface 124 in FIG. 1, and the storage unit may be the memory 123 in FIG. 1.

When the controller runs, the controller performs the method for executing a hard disk operation command in the embodiment shown in FIG. 3. For the method for executing a hard disk operation command, refer to related descriptions of steps 101, 102, 103, and 104 in the foregoing embodiment shown in FIG. 3. Details are not described herein again.

In another implementation, the determining unit 601, the save unit 602, the changing unit 603, and the execution unit 604 may be implemented in a form of integration or any combination, and a specific implementation is not limited in this embodiment of this application.

Another embodiment of the present application further provides a computer readable storage medium. The computer readable storage medium stores an instruction. When the instruction runs on a hard disk 600, the hard disk 600 performs steps 101, 102, 103, and 104 in the method for executing a hard disk operation command shown in FIG. 3.

In another embodiment of the present application, a computer program product is further provided. The computer program product includes a computer executable instruction. The computer executable instruction is stored in a computer readable storage medium. A controller 610 of a hard disk 600 may read the computer executable instruction from the computer readable storage medium. The controller executes the computer executable instruction, so that the hard disk 600 performs steps 101, 102, 103, and 104 in the method for executing a hard disk operation command shown in FIG. 3.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedure or functions according to the embodiments of the present application are generated. The computer may be a general-purpose computer, a dedicated computer, a computer network, or other programmable apparatuses. The computer instructions may be stored in a computer-readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

What is claimed is:

1. A method for queuing and executing operation commands on a hard disk, wherein the hard disk comprises a controller to implement the method, the method comprising:
receiving an operation command;
identifying a target logical unit (LUN), wherein the hard disk further comprises at least two flash memory chip groups, each flash memory chip group comprises at least one flash memory chip, each flash memory chip comprises a plurality of physical blocks, a flash memory chip in each flash memory chip group forms a logical unit (LUN), each flash memory chip belongs to one LUN, wherein a working state of the target LUN is an idle state, and when the target LUN is in the idle state, a quantity of operation commands that wait to be processed in a processing waiting queue respectively corresponding to each flash memory chip in the target LUN is less than or equal to a preset threshold;
identifying a target physical block from the target LUN, wherein the target physical block is to be accessed when the operation command is executed;
storing the operation command in a processing waiting queue corresponding to a flash memory chip to which the target physical block belongs;
when and only when the quantity of operation commands that wait to be processed in the processing waiting queue respectively corresponding to each flash memory chip in the target LUN is greater than the preset threshold, changing the working state of the target LUN to a non-idle state;
executing the quantity of operation commands in the processing waiting queue upon the target LUN; and
returning the working state of the target LUN to the idle state, wherein no operation commands are executed upon the target LUN while it is in the idle state.

2. The method according to claim 1, wherein each physical block in each flash memory chip group forms a logical block, each physical block belongs to one logical block, the operation command comprises an input/output (I/O) write command, a garbage collection write command, or a garbage collection read command, and before the determining a target LUN whose working state is an idle state, the method further comprises:
determining a target logical block, wherein an operation state of the target logical block is an idle state, and when the target logical block is in the idle state; a processing waiting queue respectively corresponding to a flash memory chip to which each physical block in the target logical block belongs does not comprise another operation command that needs to be executed when any physical block in the target logical block is accessed, and the target LUN comprises a flash memory chip to which each physical block in the target logical block belongs.

3. The method according to claim 2, wherein when the operation command is the I/O write command or the garbage collection write command, the target physical block in the target LUN is a new block.

4. The method according to claim 2, wherein the operation command comprises the I/O write command, the garbage collection write command, or the garbage collection read command, and the determining the target LUN comprises:
querying a LUN state table to determining the target LUN that has a working state parameter whose value indicates the idle state, wherein the LUN state table comprises a working state parameter of each LUN in the hard disk, and the working state parameter of the LUN is used to indicate a working state of the LUN.

5. The method according to claim 4, the method further comprises:
when operation states of all logical blocks in the target LUN are the idle state, changing a value of the working state parameter of the target LUN to the value that indicates the idle state.

6. The method according to claim 1, wherein the method further comprises:
executing the operation command and changing the operation state of the target logical block to the non-idle state when the preset threshold is zero.

7. The method according to claim 1, wherein when the preset threshold is zero, the method further comprises:
after the operation command is executed, changing the operation state of the target logical block to the idle state.

8. A hard disk, comprising:
one or more processors; and
a memory;
wherein the memory is configured to store computer program code, the computer program code comprises an instruction, and the one or more processors is configured to execute the instruction to:
receive an operation command;
identify a target logical unit (LUN), wherein the hard disk further comprises at least two flash memory chip groups, each flash memory chip group comprises at least one flash memory chip; each flash memory chip comprises a plurality of physical blocks; a flash memory chip in each flash memory chip group forms a logical unit (LUN), each flash memory chip belongs to one LUN; wherein a working state of the target LUN is an idle state, and when the target LUN is in the idle state, a quantity of operation commands that wait to be processed in a processing waiting queue respectively corresponding to each flash memory chip in the target LUN is less than or equal to a preset threshold, and when the target LUN is in the idle state, no operation commands are executed upon the LUN from the processor or the memory;
identify a target physical block from the target LUN, wherein the target physical block is to be accessed when the operation command is executed;
store the operation command in a processing waiting queue corresponding to a flash memory chip to which the target physical block belongs; and when the quantity of operation commands that wait to be processed in the processing waiting queue respectively corresponding to each flash memory chip in the target LUN is greater than the preset threshold, change the working state of the target LUN to a non-idle state, execute the Quantity of operation commands in the processing waiting queue upon the LUN, and then return the working state of the target LUN to the idle state.

9. The hard disk according to claim 8, wherein each physical block in each flash memory chip group forms a logical block, physical blocks that are in a same flash memory chip and that are in different logical blocks are different, the operation command comprises an I/O write command, a garbage collection write command, or a garbage collection read command, and before the determining the target LUN whose working state is the idle state; wherein the processor is further configured to:
determine a target logical block, wherein an operation state of the target logical block is an idle state, and when the target logical block is in the idle state, a processing waiting queue respectively corresponding to a flash memory chip to which each physical block in the target logical block belongs does not comprise another operation command that needs to be executed when any physical block in the target logical block is accessed, and the target LUN comprises a flash memory chip to which each physical block in the target logical block belongs.

10. The hard disk according to claim 9, wherein when the operation command is the I/O write command or the garbage collection write command, the target physical block in the target LUN is a new block.

11. The hard disk according to claim 9, the processor is further configured to:
execute the operation command and changing the operation state of the target logical block to a non-idle state, when the preset threshold is zero.

12. The hard disk according to claim 8, wherein the operation command comprises the I/O write command, the garbage collection write command, or the garbage collection read command; wherein the processor is further configured to:
query a LUN state table to determining the target LUN that has a working state parameter whose value indicates the idle state, wherein the LUN state table comprises a working state parameter of each LUN in the hard disk, and the working state parameter of the LUN is used to indicate a working state of the LUN.

13. The hard disk according to claim 12, wherein the processor is further configured to:
when operation states of all logical blocks in the target LUN are the idle state, change a value of the working state parameter of the target LUN to the value that indicates the idle state.

14. A non-transitory computer-readable storage medium comprising instructions which, when executed by a computer, cause the computer to carry out the steps of:
receiving an operation command;
identifying a target logical unit (LUN) within a hard disk, wherein the hard disk further comprises at least two flash memory chip groups, each flash memory chip group comprises at least one flash memory chip, each flash memory chip comprises a plurality of physical blocks, a flash memory chip in each flash memory chip group forms a logical unit (LUN), each flash memory chip belongs to one LUN; wherein a working state of the target LUN is an idle state, and when the target LUN is in the idle state, a quantity of operation commands that wait to be processed in a processing waiting queue respectively corresponding to each flash memory chip in the target LUN is less than or equal to a preset threshold and when the target LUN is in the idle state, no operation commands are executed upon the LUN from the processor or the memory;
identifying a target physical block from the target LUN, wherein the target physical block is to be accessed when the operation command is executed;
storing the operation command in a processing waiting queue corresponding to a flash memory chip to which the target physical block belongs; and
when the quantity of operation commands that wait to be processed in the processing waiting queue respectively corresponding to each flash memory chip in the target LUN is greater than the preset threshold, changing the working state of the target LUN to a non-idle state, execute the quantity of operation commands in the processing waiting queue upon the LUN, and then return the working state of the target LUN to the idle state.

15. The non-transitory computer-readable storage medium according to claim 14, wherein when the computer executing the instructions causes the computer to carry out the steps of:
determining a target logical block, wherein an operation state of the target logical block is an idle state, and when the target logical block is in the idle state, a processing waiting queue respectively corresponding to a flash memory chip to which each physical block in the target logical block belongs does not comprise another operation command that needs to be executed when any physical block in the target logical block is accessed, and the target LUN comprises a flash memory chip to which each physical block in the target logical block belongs;
wherein each physical block in each flash memory chip group forms a logical block, each physical block belongs to one logical block, and the operation command comprises an I/O write command, a garbage collection write command, or a garbage collection read command.

16. The non-transitory computer-readable storage medium according to claim 15, wherein when the operation command is the I/O write command or the garbage collection write command, the target physical block in the target LUN is a new block.

17. The non-transitory computer-readable storage medium according to claim 14, wherein the computer executing the instructions causes the computer to further carry out the steps of:
querying a LUN state table to determining the target LUN that has a working state parameter whose value indicates the idle state, wherein the LUN state table comprises a working state parameter of each LUN in the hard disk, and the working state parameter of the LUN is used to indicate a working state of the LUN; and
wherein the operation command comprises the I/O write command, the garbage collection write command, or the garbage collection read command.

18. The non-transitory computer-readable storage medium according to claim 14, wherein the computer executing the instructions causes the computer to further carry out the steps of:

executing the operation command and changing the operation state of the target logical block to the non-idle state when the preset threshold is zero.

\* \* \* \* \*